March 11, 1952 C. B. SCHNEIBLE ET AL 2,589,149
APPARATUS FOR TREATMENT OF GAS
Filed Nov. 28, 1947
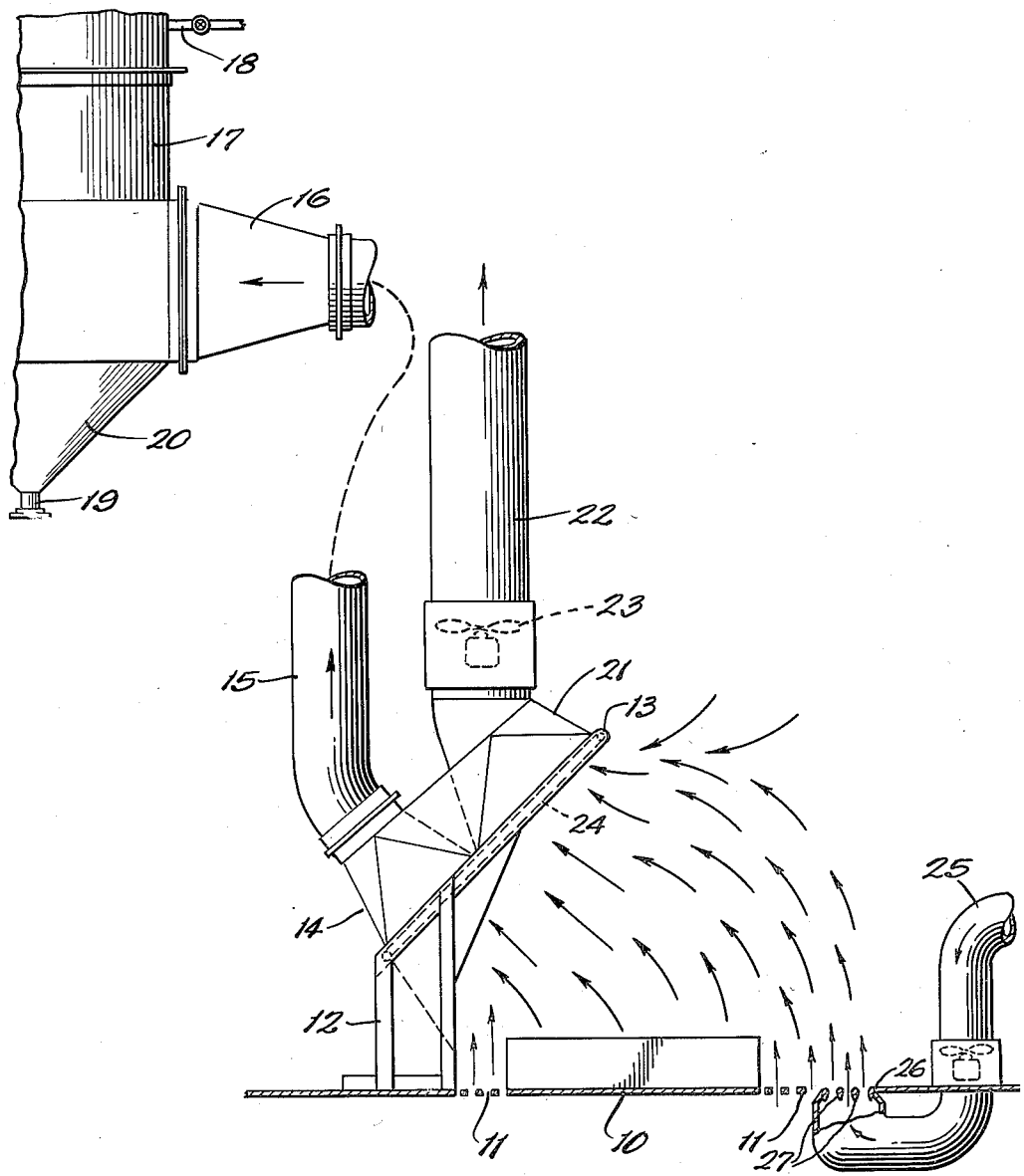
Inventors:
Claude B. Schneible
and Alvin S. Landy,
By Dawson, Ooms, Booth and Spangenberg,
Attorneys.

Patented Mar. 11, 1952

2,589,149

UNITED STATES PATENT OFFICE 2,589,149

APPARATUS FOR TREATMENT OF GAS

Claude B. Schneible, Detroit, and Alvin S. Lundy, Huntington Woods, Mich.; said Lundy assignor to said Schneible Application November 28, 1947, Serial No. 788,496

3 Claims. (Cl. 183—75)

This invention relates to the treatment of gas, and the like, and is particularly useful in the treatment of particle-laden gas, such as, for example, the column of gas rising from a grate and containing dust, smoke, fumes, etc.

In the treatment of a column of gas containing smoke, fumes, dust particles, etc. rising from a grate, or the like, it has been the practice heretofore to discharge the same directly into the atmosphere or to treat the entire column in separating apparatus. The first operation is unsatisfactory because it contaminates the atmosphere of the surrounding area. The second operation is extremely expensive and requires large equipment to handle all of the material.

An object of the present invention is to provide apparatus for separating the rising column into two fractions, discharging the heavy fraction into treating apparatus and then discharging a lighter fraction, which is innocuous, directly into the atmosphere, while also providing means for insuring that all of the light material is effectively recovered. A still further object is to provide means for blanketing one side of a rising column of particle-laden gas so as to render highly effective suction devices on the opposite side of the blanket for fractionating the column. A still further object is to provide means for enclosing a rising column of particle-laden gas with a curtain of harmless gas, such as air, while at the same time providing effective fractionating means for separating the confined column into components which require treatment and components which do not require treatment or which require different treatment. Other specific objects and advantages will appear as the specification proceeds.

The invention is illustrated, in a single embodiment, by the accompanying drawing, in which there is shown, in side elevation, a diagrammatic arrangement of structure embodying our invention.

In the illustration given, 10 designates a grate structure having openings 11 through which a rising column of gas, containing dust, smoke, fumes, etc., escapes. The grate structure illustrated is merely shown for the purpose of indicating one example of a rising column of material which may be effectively treated by our new method and apparatus.

In the illustration given, we provide a frame 12 supporting a border frame 13. Mounted in the lower portion of the frame 13 is an intake casing 14, which opens laterally of and extends slightly over the rising column of gas. The intake 14 communicates with a suction pipe 15 leading to the inlet 16 of the tower or column 17. The tower is provided with the usual liquid pipe 18 by which liquid, such as water, oil, solvents, or other treating material, is brought into contact with the rising gas within the suction column. The column is maintained under suction so as to draw the gas therethrough and for the effective separation thereof. Since suction separating columns of this character are well known and since no claim per se is made to such columns herein, it is believed unnecessary to describe the column in detail. An example of such a column is shown in Schneible Patent No. 2,141,829. The gas within the tower is usually rotated and brought in contact with the liquid, and the liquid together with the particulate matter is withdrawn through pipe 19 leading from the conical bottom 20 of the tower.

Supported in the border frame 13 above the intake 14 is a second intake 21. Intake 21 communicates with a pipe 22, in which there is mounted a stack fan 23. The pipe 22 preferably leads to the atmosphere for the venting of material received therein to the atmosphere. However, it will be understood that the pipe 22 may lead to any other treating equipment, if desired.

The intakes 14 and 21 may be free at their inner ends, if desired. We prefer, however, to equip the frame with a group of parallel spaced louvres or ribs 24. Louvres, such as are shown in Schneible Patent No. 2,277,271, are useful in connection with this apparatus.

In order to increase the effectiveness of the fractionation and also in order to insure the recovery of all of the volatile material to be removed from the building, we provide a fluid curtain device of the character illustrated. In this device, we employ a pipe 25 leading from a source of harmless gas, such as, for example, air, and the air is discharged under pressure through an elongated outlet 26. In the outlet 26, we prefer to employ louvres 27, which may be substantially teardrop-shaped and which extend longitudinally of the elongated opening 26. The louvres or ribs 27 break up the stream into separate streams of air, etc., and the streams are discharged upwardly toward the top portion of the frame 14. If desired, the air may be discharged more directly toward the frame 13, depending upon the type of material being handled.

By employing a discharge structure in which parallel louvres or ribs 27 extend across the elongated opening, we find that a longer stream or blanket of air is provided. The side streams enable the central stream of air to be projected a longer distance because the side streams free the central stream of frictional resistance for a considerable portion of its length.

In the operation of the structure, air or other gas is discharged through the pipe 25 to provide a curtain extending along one side of the rising column of dust, smoke, etc. The stream of air from the outlet 26 serves as a blanket to hem in or enclose the rising column on one side, and this enclosure we find renders the fractionation effect of the two inlets 14 and 21 much more effective.

The lower inlet 14 draws the heavier particles within the rising column of gas into the suction pipe 15. The heavier body of gas thus withdrawn is passed to the treating column 17. Here the particulate matter, or any other selected components, may be removed, and the gas freed therefrom may be discharged into the atmosphere, or otherwise treated. On the other hand, the upper intake 21 draws the light fumes or smoke containing very little particulate matter into the outlet pipe 22, and such material may be discharged directly into the atmosphere, where it does not harm, or delivered to any other place for treatment.

The use of the air curtain on one side of the rising column of gas to be treated increases the suction effect of the two intakes 14 and 21 and the fractionating effects of such intakes, while at the same time the blanket insures the feeding of the light fumes, etc. into the upper intake and prevents their escape into the room or building. The curtain may be of any desired size, and it may be formed of any desired configuration by merely changing the shape of the outlet 26. Thus, the outlet 26 may be formed in a single line, or it may be curved to provide a suitable enclosure for the column of gas.

While we have shown only two intakes 14 and 21, it will be understood that such intakes may be of any desired number and may be controlled in any manner to effect the desired fractionation of the column of gas.

While in the foregoing specification we have shown a single embodiment of structure in great detail for the purpose of illustrating an embodiment of the invention, it will be understood that such details may be varied widely by those skilled in the art without departing from the spirit of our invention.

We claim:

1. In apparatus for treating a rising column of particle-laden gas, means for discharging gas streams to form a curtain about said column on one side, a plurality of vertically-related suction intakes communicating with the opposite side of said column of gas, a separate draw-off conduit for each of said intakes, means for separating the particulate matter received in the lowermost of said intakes, and means for venting to the atmosphere the column of gas received in the uppermost of said intakes.

2. In apparatus for treating a rising column of gas, means for discharging a curtain of gas about said column on one side, a plurality of vertically-related suction intakes communicating with the opposite side of said column of gas, a separate draw-off conduit for each of said intakes, means for treating the gas received in the lowermost of said intakes by contacting the gas with liquid, and means for venting to the atmosphere the column of gas received in the uppermost of said intakes.

3. In appartus for treating a rising column of gas, means for discharging a plurality of parallel gas streams to form a curtain about said column on one side, a plurality of vertically-related suction intakes communicating with the opposite side of said column of gas, a separate draw-off conduit for each of said intakes, means for treating the column of gas received in said lowermost intake by contacting it with liquid, and means for venting to the atmosphere the column of gas received in the uppermost of said intakes.

CLAUDE B. SCHNEIBLE.
ALVIN S. LUNDY.

REFERENCES CITED

The following references are of record in the file of this patent:

UNITED STATES PATENTS

| Number | Name | Date |
|---|---|---|
| 1,720,863 | Stebbins | July 16, 1929 |
| 2,074,317 | Allan et al. | Mar. 23, 1937 |
| 2,076,399 | Carson | Apr. 6, 1937 |
| 2,257,516 | Roche et al. | Sept. 30, 1941 |